United States Patent [19]
Eccleston et al.

[11] 3,806,096
[45] Apr. 23, 1974

[54] FENCE TRIM AND VEGETATION BARRIER

[76] Inventors: John R. Eccleston, 6017 Hillcrest, Detroit, Mich. 42236; Kenneth E. Blomme, 11135 Lorman, Sterling Heights, Mich. 48077

[22] Filed: Oct. 27, 1972

[21] Appl. No.: 301,593

[52] U.S. Cl............................ 256/32, 47/33, 52/102, 256/1
[51] Int. Cl............................................. E04h 17/06
[58] Field of Search ................ 256/119, 32, 33, 34; 52/102; 47/33, 25

[56] References Cited
UNITED STATES PATENTS

| | | | |
|---|---|---|---|
| 3,515,373 | 6/1970 | Abbe | 256/32 |
| 3,619,944 | 7/1970 | Matvey | 47/33 |
| 3,393,897 | 7/1968 | Wright | 256/32 |
| 3,713,624 | 1/1973 | Nieman | 256/32 |
| 3,384,351 | 5/1968 | Turner, Jr. | 256/32 |

Primary Examiner—Jordan Franklin
Assistant Examiner—Conrad L. Berman
Attorney, Agent, or Firm—Weiner, Basile and Weintraub

[57] ABSTRACT

A fence trim and vegetation barrier of the type adapted for installation with a conventionally constructed fence having vertical posts which are spaced at predetermined distances and carrying vertical fence elements suspended above a ground area wherein vegetation normally grows. The barrier, comprising a shell telescopically receiving a core member, is positioned on the ground area to restrict the growth of the vegetation immediately beneath the fence element. The shell has a longitudinally disposed slot at one end adapted to receive the lower portion of one vertical post when the shell is positioned on the ground area while the core member is extendable from the other end of the shell into abutment with the lower portion of the next adjacent vertical post. The extendable end of the core member is, in turn, telescopically received in the slot end of a second barrier shell. In a preferred embodiment the shell and core member are fabricated from a plastic material with the core member being of a solid construction.

6 Claims, 3 Drawing Figures

PATENTED APR 23 1974  3,806,096

FENCE TRIM AND VEGETATION BARRIER

BACKGROUND OF THE INVENTION

1. Field of the Invention

The present invention relates generally to a means for underlining a fence and for surrounding fence posts to prevent the growth of vegetation immediately thereabout and, in particular, the present invention relates to a telescopically expandable fence trim and vegetation barrier of a plastic construction.

2. Description of the Prior Art

In the maintenance of lawns the growth of vegetation, such as grass, adjacent to and directly beneath fences has long posed a problem because of the difficulty in keeping this vegetation trimmed. Often trimming of the vegetation beneath the fence involves special equipment and/or labor that is difficult to perform even with special equipment and in most situations the vegetation must be trimmed by hand. Special chemical solutions intended to inhibit the growth of vegetation in such areas have been proposed but have failed to find general acceptance mostly because of the unsightly appearance of the ground area immediately beneath the fence as a result of using such special chemical solutions.

Heretofore, various vegetation-growth restricting devices have been suggested as, for example, in U.S. Pat. Nos. 2,826,393, 3,384,351, 3,393,897 and 3,515,373. The device disclosed in U. S. Pat. No. 2,826,393 includes a plurality of interlocking hollow concrete members partially buried in the ground area beneath the fence with the interlocking ends of the hollow members being individually formed with concrete being utilized for each member to ensure that the vegetation retarding device remains in position. Such a device is complicated in its structure, expensive to manufacture and very difficult to install.

Improvements in fence trim and vegetation barrier devices are disclosed in U.S. Pat. Nos. 3,384,351 and 3,393,897. The devices disclosed herein alleviate many of the disadvantages encountered in the concrete type structure. However, these devices are of a complex design and usable only with fences that have their vertical post members spaced at exact predetermined distances, all of which limits the use of the fence trim device as well as the freedom of the fence owner to position and construct any desired type of fence. The greatest disadvantages of the devices disclosed in the aforementioned patents is that installation of the fence trim device can be made only during installation of the fence, and thus, such barriers and fence trim devices are not usable for installation with existing fence structures.

The fence trim device disclosed in the aforementioned U.S. Pat. No. 3,515,373 alleviates several of the aforementioned problems and disadvantages of the prior art structures. However, this fence trim device is of a complicated design, and thus, costly to manufacture and, in addition, must be embedded within the ground which is quite difficult to accomplish during installation with a previously existing fence structure.

SUMMARY OF THE INVENTION

The present invention which will be described subsequently in greater detail comprises a fence trim and barrier device comprising an elongated shell having at one end thereof an elongated slot disposed along the longitudinal axis of the shell. A core member is telescopically received at the other end of the shell and is slidably extendable therefrom.

It is therefore an object of the present invention to provide a new and improved fence trim and barrier device which is of a light weight construction, readily portable, easy to install, efficient in operation, durable in use and attractive in appearance.

Other objects, advantages and applications of the present invention will become apparent to those skilled in the art of fence trim and vegetation barriers when the accompanying description of one example of the present invention is read in conjunction with the accompanying drawing.

BRIEF DESCRIPTION OF THE DRAWING

The description herein makes reference to the accompanying drawing wherein like reference numerals refer to like components throughout the several views, and in which.

DESCRIPTION OF THE PREFERRED EMBODIMENT

Figures 1, 2, 3:
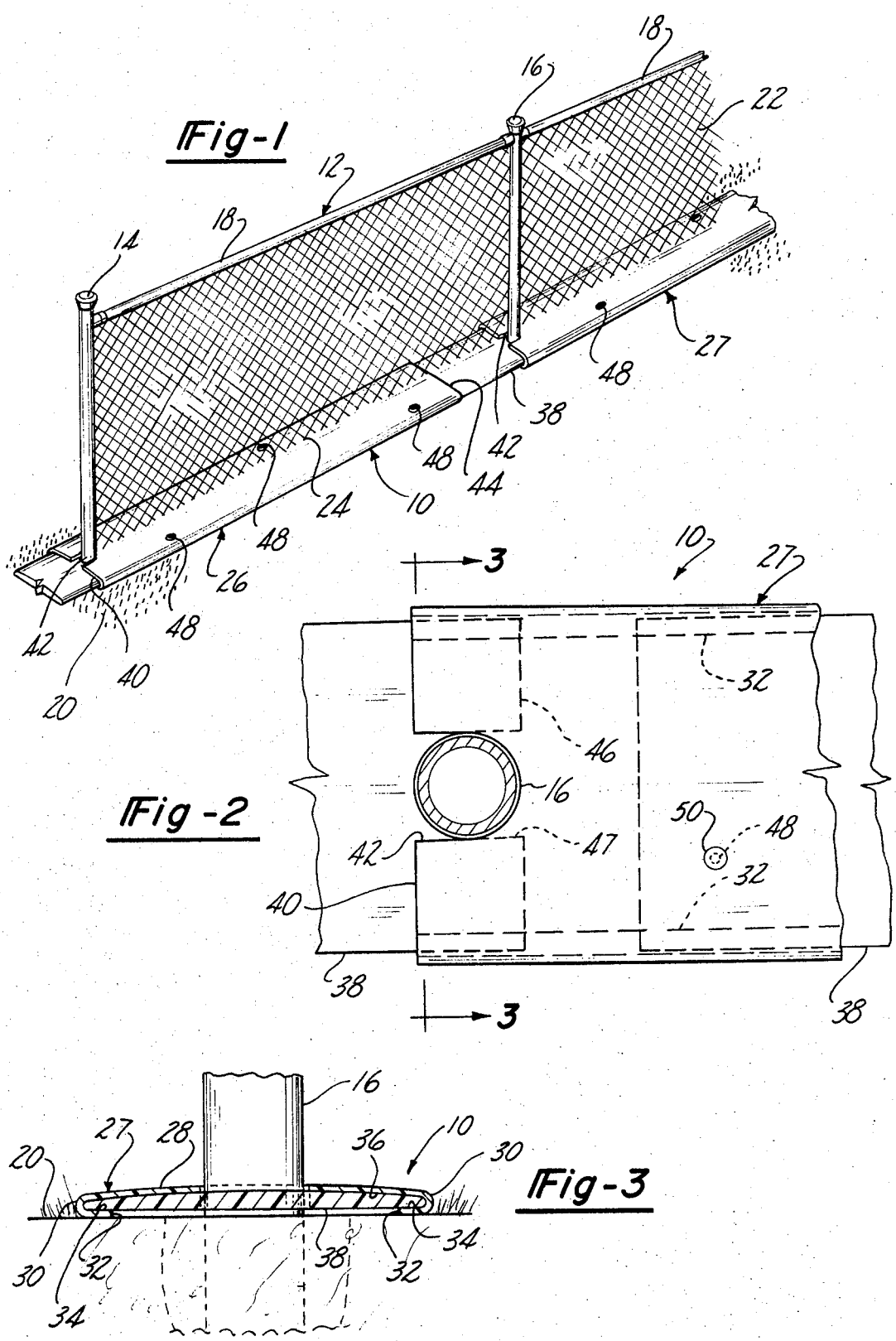
FIG. 1 is a perspective view showing a section of a conventionally constructed fence with a fence trim and barrier device constructed and assembled in position in accordance with the principles of the present invention.
FIG. 2 is a fragmentary top plan view of the fence trim and vegetation barrier device illustrated in FIG. 1.
FIG. 3 is a fragmentary cross-sectional view of the fence trim and vegetation device taken along the line 3—3 of FIG. 2.

Referring now to the drawing and, in particular, to FIG. 1 wherein there is illustrated one example of the present invention in the form of a fence trim and vegetation barrier device 10 shown in position under a portion of a conventional metal fence 12 of the chain link type, the fence 12 comprises a plurality of regularly spaced vertical posts, two of which are illustrated in FIG. 1 and indicated by the numerals 14 and 16. The posts 14 and 16 are connected at their top sections by a horizontally extending top rail 18. The posts and rail support above the ground 20 an open weave wire or fence elements 22 in a conventional manner with the lower edge 24 of the fence elements 22 being suspended above the ground 20.

The fence trim and vegetation barrier device 10 comprises an elongated shell 26 having a u-shaped cross section (FIG. 3) including an outwardly bowed upper base 28 and opposed lateral flanges 30 which terminate in inwardly bent ends 32. The inner surface 34 of each of the inwardly bent ends 32 forms a support surface which cooperates with the interior or inner surface 36 of the shell 26 to slidably support an extension core 38 as will be described hereinafter. The shell 26 is preferably fabricated from a plastic material and may be an extruded piece having a thickness of approximately one-eighth inch and a longitudinal length of approximately 6 to 6½ feet. As can best be seen in FIGS. 1 and 2, one end 40 of each shell 26 has a longitudinally disposed slot 42 terminating in a circular inner edge, the slot 42 being adapted to receive the lower end portion of the fence post 14. The end 40 of the shell 26 extends beyond the post 14 for a purpose to be described. The next adjacent shell 27 which is identical to the shell 26 has its slot 42 in engagement with the post 16.

The extendable core member 38 is telescopically received within the opposite end 44 of the shell 26 and is slidably supported by the aforementioned support surface 34 and 36. The extended end 46 of the core member 38 has a longitudinally disposed slot 47 terminating in a circular inner edge similar to the slot 42. When the slotted end 42 of the shell 26 is inserted around the vertical post 14, as illustrated, the core member 38 is telescopically extended from the shell 26 until the end 46 thereof is received within the end 40 of the fence trim shell 27 immediately thereahead and the core slot 47 receives the lower end portion of the fence post 16, such that the post 16 is fully encircled by the interlocking arrangement of the shell 27 and the core member 38.

The extendable core member 38 is preferably fabricated from solid plastic material having a thickness of approximately one-half inch, approximately 6 inches in width and a length of approximately 6 feet. The extendable core member 38 may also be fabricated from a tubular plastic material but is preferably of a solid construction to add additional weight to the fence trim and vegetation barrier device 10 so that the same will remain in place after installation.

To facilitate the permanent installation of the fence trim 10 the base 28 of each shell 26 (or 27) is provided with regularly spaced apertures 48 alternately disposed on opposite sides of the longitudinal axis of the shell. A plastic stake 50 (FIG. 2) or the like is driven through each aperture 48 to secure the shell 26 (or 27) to the ground 20. That portion wherein the extendable core member 38 is within the shell 26, the stake 50 is inserted through the aperture 48 and a previously drilled bore (not shown) in core member 38 whereby the stake 50 functions to not only secure the trim and barrier device 10 in a proper position, but prevents relative telescopic movement between the shell 26 and the core member 38 once the device 10 has been placed in proper position. The engagement of the slotted end 40 of the shell 26 with the post 14 and the engagement of the extended end 44 of the core member 38 with the end 40 of the next adjacent shell 27 in conjunction with the stakes 50 driven through the shell and the core member 38 provides a very secure means for preventing the trim 10 from being accidentally displaced from under the fence 12 during normal use.

It can thus be seen that the present invention, by having a shell of approximately 6 feet in length and an extendable core member which is also 6 feet in length, the fence trim 10 may be adapted for use to provide a fence trim and vegetation barrier device between posts which are evenly or unevenly spaced from 6 to 12½ feet apart. It can also be appreciated that the length of the shell 26 and core member 38 may be fabricated at any desired lengths.

The distinct advantages of the fence trim and vegetation barrier device 10 of the instant invention over those disclosed in the prior art are numerous. In particular, the instant device 10 need not be embedded within the ground as required in many of the prior art devices. Further, the trim and barrier device 10 may be installed with new fences at the time of installation or may simply be installed on previously existing fences without any undue burden or difficulty. It can also be seen that because of its plastic construction the fence trim and barrier device 10 is flexible to permit the same to conform to the irregularities of the ground area under the fence elements and between the fence posts 14 and 16, yet with the solid core member 38 the fence trim 10 is both rigid and durable.

It can also be seen that with the preferred manner of manufacturing the fence trim and barrier device 10 with a plastic material or the like, the fence trim 10 is not subject to corrosion or early deterioration and due to the use of a relatively inexpensive plastic, such as a polyethylene, a very simple and relatively inexpensive product may be had.

It should also be understood that although the present invention has been shown in conjunction with a chain link type fence, the instant fence trim and vegetation barrier may be used in conjunction with any fence having regularly spaced vertical posts for supporting fence elements or the like.

It can further be seen, that by using a colored plastic material such as a green color, the trim and vegetation barrier will blend in with the gass and add to the overall appearance of the fence and adjacent lawn.

Although only one form of the present invention has been disclosed, it should be understood by those skilled in the art of fence trim and vegetation barrier devices that other forms may be adopted all coming within the spirit of the invention and scope of the appended claims.

What is claimed is as follows.

1. A barrier device adapted for installation with a fence of the type having at least two vertical posts spaced apart at a predetermined distance, said posts carrying vertical fence elements suspended above a ground area wherein vegetation normally grows, said barrier device adapted to overly said ground area to restrict the growth of said vegetation immediately beneath said fence elements, said barrier device comprising:

a shell member comprising an elongated sheet of a U-shaped cross-section and having a curved base with downwardly extending legs terminating at inwardly bent longitudinal walls, the longitudinal edges of said walls being disposed in an opposing relationship on the underside of said shell member, the upper surfaces of said longitudinal walls being disposed in a horizontal plane and spaced below the inner surface of said base, the bottom surfaces of said longitudinal walls adapted to abut said ground area to support said shell member, said shell member having an end-to-end length less than said predetermined distance between said vertical posts, one end of said shell member base having a slot adapted to receive one of said vertical posts when said shell member is positioned end to end between said posts the other end of said shell member base being spaced from said other vertical post with said bottom surfaces of said longitudinal walls overlying said ground area, said shell member having an end-to-end longitudinal opening of a selected shape defined by the interior surfaces of said base, legs and the upper surfaces of said longitudinal walls;

a core member telescopically received within said shell member opening at said other end of said shell member, said core member being extendable from said shell member wherein the extended end of said core member is adapted to abuttingly contact the other of said vertical post, said core member being of a solid construction and having a peripheral shape mating with the interior shape of said shell member while the bottom surface of said core member is disposed on said horizontal plane and slidably supported by said upper surfaces of said longitudinal walls.

2. The barrier device defined in claim 1 wherein said core member extended end has a slot formed therein adapted to receive said other vertical post.

3. The barrier device defined in claim 1 further comprising a plurality of stake members;

a plurality of apertures regularly spaced along the length of said shell member base, said apertures being alternately spaced on opposite sides of the longitudinal axis of said shell member base and adapted to receive said stake members when driven therethrough and into said ground area to secure said shell member to said ground area, said stakes being driven through said core member and into said ground area where said core member is beneath said apertures to secure said core member to said ground as well as to said shell member to prevent relative telescopic movement between said shell member and core member.

4. The barrier device defined in claim 1 further comprising a plurality of stake members;

a plurality of apertures spaced along the length of said shell member base; said apertures adapted to receive said stake members when driven therethrough, said stake members being driven through said core member and into said ground area when said core member is beneath said apertures to secure said core member and said shell member to said ground as well as to prevent relative telescopic movement between said shell member and said core member.

5. The barrier device defined in claim 1 further comprising a second of said shell member having said predetermined end-to-end length with one end thereof having a slot adapted to receive the other of said post when said second shell member is positioned beneath said fence element overlying said ground area, said one end of said second shell member extending beyond said other post toward said first post, said core member being telescopically received in said one end of said second shell member to encircle said other post.

6. The barrier device defined in claim 1 wherein said members are fabricated from a plastic material.

* * * * *